Oct. 15, 1935. A. TROCCOLI Re. 19,726

HAIR DRYING MACHINE

Original Filed Feb. 19, 1929

Inventor
Achille Troccoli
By his Attorneys
Williamson & Williamson

Reissued Oct. 15, 1935 Re. 19,726

UNITED STATES PATENT OFFICE 19,726

HAIR DRYING MACHINE

Achille Troccoli, Belmont, Mass., assignor to The Charles Arnao Company, Inc., Minneapolis, Minn., a corporation of Minnesota Original No. 1,773,083, dated August 12, 1930, Serial No. 341,130, February 19, 1929. Application for reissue May 12, 1932, Serial No. 610,964

5 Claims. (Cl. 34—26)

My present invention relates to hair drying where heated air as the drying medium is circulated or impinged against the hair and scalp.

With the use of present hair drying machines of which I am familiar, it requires a considerable length of time, approximately an hour, to dry the hair. This is particularly true when permanent waving or finger waving is performed, due to the fact that various ointments are utilized to set the waves, and these ointments form a coating or film on the hair through which it is difficult to penetrate with the heated air.

An important object of the present invention, therefore, is the provision of a machine which will effect a complete penetration of all of the hair of the head with the heated air, thus resulting in greatly reducing the time required for drying. By the use of my novel machine I am enabled to completely dry a head of hair in approximately ten minutes. The advantages of this quick drying feature are numerous, and will be readily appreciated by those skilled in the art, as well as by those being treated by said machine.

Another object of the invention is to provide means to direct the heated air first to those parts of the hair which are the wettest, that is, the sides, extreme front and back.

Another object of the invention is the provision of such a machine, so constructed and arranged that the heated air will have very little, if any, contact with the face and neck of the person under treatment.

In carrying out my invention I utilize a funnel or helmet having direct connection to a source of heated air, preferably introduced into the funnel under pressure, as by an electric fan, an electric heater being interposed in the path of the air to heat the same as it passes. The outer end of this funnel or helmet is enlarged, forming a chamber to receive a portion of the head. Within this first helmet is a second helmet, adapted also to receive a portion of the head of the person under treatment, said second funnel having an outlet at the top of the first funnel.

Said second funnel will act as a baffle plate upon the air being introduced into the machine and will direct said current of heated air downwardly over the front, sides and back of the hair. The outlet from the second or smaller helmet is piped to the side of the motor which serves as an inlet, and the fan which blows the air from the motor through the first funnel will act to suck the air from the second funnel or helmet. This sucking action will operate, after the heated air has passed a slight distance below the first funnel, to draw said air upwardly, under and through the hair at the front, sides and back, effecting a thorough drying action of said hair, and the air will then be directed back to the blower fan and again passed through the first funnel so that a continuous circulation of the heated air is effected. This arrangement also requires less heating capacity on the part of the heating unit, as the air will already be preheated before contact with said heater, thus resulting in an economy of operation of this machine.

If I desired, I may position, in the second or internal helmet, a perforated baffle plate, to direct the major portion of the air passing upwardly through said second helmet around the sides thereof, but still permitting sufficient heated air to contact with the top of the head to thoroughly dry the hair at that point.

Thus an even, quick drying of all the hair on the head is effected in an extremely short space of time, far quicker than has heretofore been considered possible, and without the usual discomfort to the person under treatment.

I believe that the machine and method of the present invention, as hereinabove disclosed are novel, and I have therefore claimed the same broadly in the present application.

The above and other features and objects of the invention, details of construction, combinations of parts, and advantages, will be hereinafter more fully pointed out, described and claimed.

Referring to the drawing, illustrating a preferred embodiment of the invention,

Figure 1:
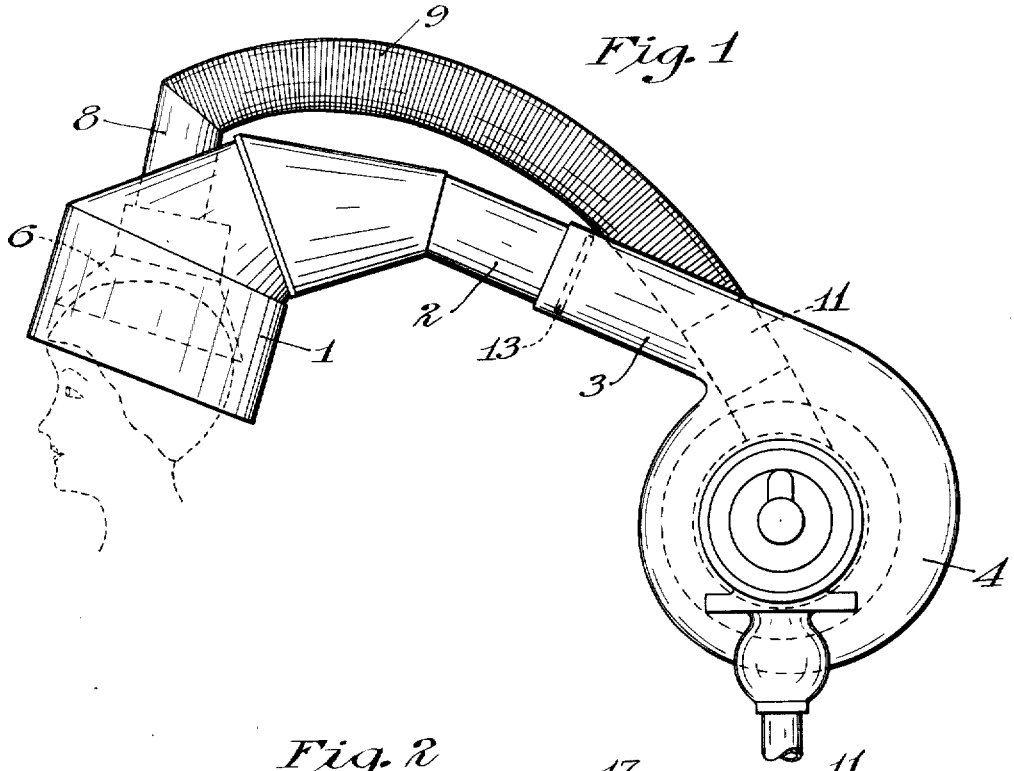
Fig. 1 is a side elevation of my novel machine, illustrating it in use.

Referring now to the drawing for a particular description of the invention, my novel hair drier is constructed in the form of a helmet or funnel 1 having a reduced end 2 adapted to be connected to the sleeve 3 of a motor blower 4, this blower having a fan 5 constructed to blow air through the sleeve 3 and into the reduced portion 2 and thence outwardly and downwardly through the helmet 1.

Fixed within the helmet 1 is a second helmet 6, adapted to also receive a portion of the head, as illustrated in Fig. 1. This helmet 6 has an outlet 7 at the top of the helmet 1, in which outlet is adapted to fit the sleeve 8 of a flexible pipe 9, said pipe 9 having a sleeve 11 on its opposite end adapted to fit into a casing 12 affixed to the side of the blower chamber 4 and over the opening usually utilized as an air inlet for said blower.

While I have illustrated a flexible pipe 9, it will be appreciated that this is for illustrative purposes only and that I am not limited thereto.

When in use the helmet 1 is placed over the head, as illustrated in Fig. 1, in which position a portion of the head will preferably enter the helmet 6, as clearly illustrated.

Figure 2:
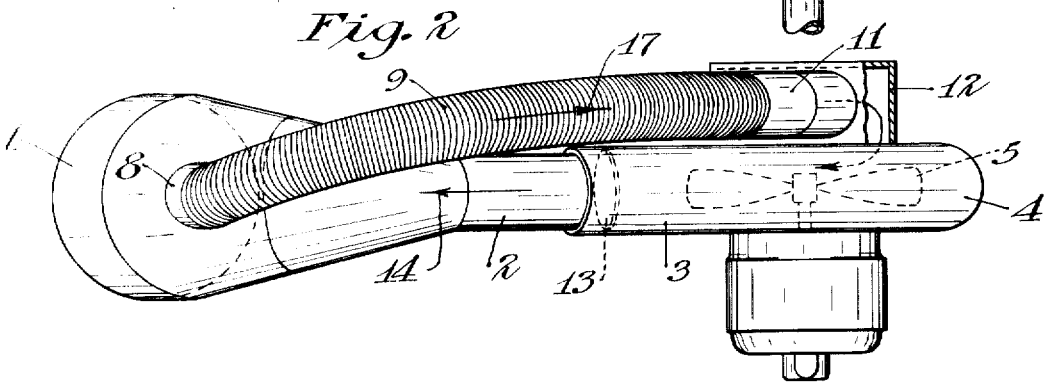
Fig. 2 is a top plan view of the machine.
Figure 3:
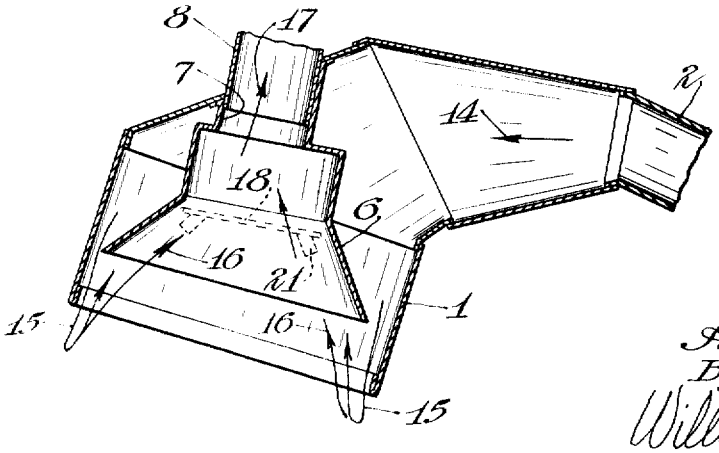
Fig. 3 is a fragmentary medial sectional view illustrating the arrangement of the two helmets and the directions of the currents of heated air.
Figure 4:
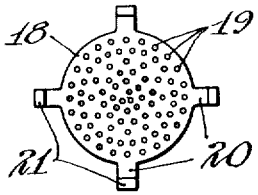
Fig. 4 is a plan view of the perforated baffle plate which may be utilized if desired.

Thereupon the motor is started, and the fan 5 will force a current of air through the sleeve 3, which current of air will pass the electric heater 13. This heated current of air passes in the direction of the arrows 14 illustrated in Figs. 2 and 3.

The current of heated air will then strike the inclined walls of the internal helmet 6, and will be deflected downward around the inner walls of the helmet 1, as indicated by the arrows 15.

Meanwhile, however, the fan 5 will be exerting a suction through the casing 12, and will thus suck the air through the pipe 9. This suction will be sufficiently strong so that the heated air will only pass a short distance below the bottom of the helmet 1 before the suction will draw it upwardly, into the helmet 6, as illustrated by the arrows 16, whence it will pass through the outlet 7 and pipe 9 to the casing 12 as indicated by the arrows 17, and thence into the blower and back through the sleeve 3 and helmet 1. Thus a continuous circulation of the heated air is created, and as said air is sucked upwardly into the helmet 6, it will penetrate under and through the hair of the person under treatment, thus causing a thorough permeation of the heated air through the hair of said person, and effecting a quick efficient and thorough drying thereof, with no resulting discomfort to the said person.

The heated air will not pass far enough below the bottom edges of the helmet 1 to cause any discomfort to the face or neck of the person under treatment.

If desired, I may position a baffle plate 18 provided with a plurality of perforations 19 in the helmet 6, this baffle plate being spaced from the inner walls of said helmet by webs 20, and secured to the said inner walls of the helmet 6 by lugs 21 in any desirable manner as by soldering, welding, brazing, riveting or the like.

The effect of this baffle plate 18 will be to cause the major portion of the air under suction to be drawn through the helmet 6 around the edges of the baffle plate 18, while still permitting a sufficient amount of said heated air under suction to pass over the top of the head of the person under treatment to effect a thorough drying of that portion of the head and hair.

The advantages, efficiency, thoroughness, and economy of my novel machine, and of the complete circulation of heated air, and the combined blowing and suction thereof, will be instantly apparent to those skilled in the art, and the merits of my novel machine have already been established and proven.

From the foregoing description it will be further seen that I have invented a new method of drying human hair which consists in confining a strata of air surrounding the scalp and hair of a human head by suitable means, such as an open bottomed hood, continuously projecting heated air under pressure against the hair and scalp to cause it to thoroughly permeate the hair of a person and continuously withdrawing a substantial portion of the projected air from the confined space through the hair of said person and reheating the same and again projecting the withdrawn air against the hair and scalp by recirculation.

While I have necessarily described my present machine somewhat in detail, it will be appreciated that I may vary the size, shape and arrangement of parts within reasonably wide limits without departing from the spirit of the invention.

My invention is further described and defined in the form of claims as follows:

What is claimed is:—

1. In a hair drying machine, a helmet adapted to fit over a portion of a head, a second helmet within said first helmet, means to create a continuous current of air downwardly through said first helmet and upwardly through said second helmet, and a baffle plate positioned in said second helmet to deflect the major portion of the ascending air to adjacent to the inner walls of said second helmet.

2. In a hair drying machine, a helmet adapted to fit over a portion of a head, a second helmet within said first helmet, means to create a continuous current of air downwardly through said first helmet and upwardly through said second helmet, and a perforated baffle plate positioned in said second helmet to deflect the major portion of the ascending air to adjacent to the inner walls of said second helmet.

3. A hair drier comprising: a hood, open at its front, and adapted to receive loosely the head of a person, and thereupon, to define a space open to atmosphere surrounding the upper part of such head; air heating means; and means for recirculating a stream of air over a path comprehending flow in said space toward such head flow outside said hood beyond the edges thereof, flow in said space from such head, and flow subject to the action of said heating means.

4. A hair drier, comprising: a hood, open at its front, and adapted to receive loosely the head of a person, and thereupon, to define a space open to the atmosphere surrounding the upper part of such head; air heating means; and means for recirculating a stream of air over a path comprehending flow in said space toward such head about the periphery of such head and beyond the edges of said open hood loosely fitting the head and under pressure, flow in said space along such head to the crown area of such head, flow in said space from such head at said crown area and under suction, and flow subject to the action of said heating means.

5. A hair drier comprising: a hood, open at its front, and adapted to receive loosely the head of a person, and thereupon, to define a space open to the atmosphere and surrounding the upper part of such head; a shell in said space defining therewithin an inner area and defining an outer area between itself and said hood; air heating means and means for recirculating a stream of air over a path comprehending flow in said space toward such head, flow outside said hood beyond the edges thereof, flow in said space from such head and through said shell under suction and flow subject to the action of said heating means.

ACHILLE TROCCOLI.